United States Patent
Güllük

(10) Patent No.: US 11,808,335 B2
(45) Date of Patent: Nov. 7, 2023

(54) HYDRODYNAMIC TORQUE CONVERTER HAVING CONVERTER LOCK-UP CLUTCH

(71) Applicant: Schaeffler Technologies AG & Co. KG, Herzogenaurach (DE)

(72) Inventor: Toros Güllük, Lichtenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 9 days.

(21) Appl. No.: 17/637,163

(22) PCT Filed: Jul. 2, 2020

(86) PCT No.: PCT/DE2020/100579
§ 371 (c)(1),
(2) Date: Feb. 22, 2022

(87) PCT Pub. No.: WO2021/037298
PCT Pub. Date: Mar. 4, 2021

(65) Prior Publication Data
US 2022/0333672 A1     Oct. 20, 2022

(30) Foreign Application Priority Data

Aug. 23, 2019   (DE) .................... 10 2019 122 692.9

(51) Int. Cl.
*F16H 45/02*         (2006.01)
(52) U.S. Cl.
CPC ..... *F16H 45/02* (2013.01); *F16H 2045/0226* (2013.01); *F16H 2045/0263* (2013.01);
(Continued)

(58) Field of Classification Search
CPC ............. F16H 45/02; F16H 2045/0226; F16H 2045/0263; F16H 2045/0284; F16H 2045/0294
See application file for complete search history.

(56) References Cited

U.S. PATENT DOCUMENTS 2,943,516 A  *  7/1960  Herndon ................. F16D 33/00
                                                     475/275
9,297,448 B1    3/2016  Depraete et al.
(Continued)

FOREIGN PATENT DOCUMENTS

DE           4316289 A1   11/1993
DE       102014224114 A1    6/2015
(Continued)

*Primary Examiner* — Huan Le

(57) ABSTRACT

A hydrodynamic torque converter is provided with a converter housing and a converter torus with a pump impeller, a turbine wheel which is driven hydrodynamically by the pump impeller by a converter fluid. In order to bridge the hydrodynamic drive, a converter lock-up clutch which is connected between the pump impeller and the turbine wheel by pressure loading of the converter fluid is arranged radially between an outer circumference of the converter housing and the converter torus. In order to provide the converter lock-up clutch with an increased transmission capacity, the turbine wheel is assigned at least one friction disc which can be prestressed axially between a pressure-loaded annular piston, which is hooked in an axially movable manner into the converter housing, and a mating friction surface of a converter housing section radially outside the converter torus.

20 Claims, 3 Drawing Sheets

(52) U.S. Cl.
CPC ............... *F16H 2045/0284* (2013.01); *F16H 2045/0294* (2013.01)

(56) References Cited

U.S. PATENT DOCUMENTS

| | | | |
|---|---|---|---|
| 10,018,262 | B2 | 7/2018 | Depraete et al. |
| 10,030,752 | B2 | 7/2018 | Lindemann et al. |
| 10,180,182 | B2 * | 1/2019 | Durham ................ F16H 61/143 |
| 2014/0097055 | A1 | 4/2014 | Lindemann et al. |
| 2018/0252304 | A1 | 9/2018 | Durham et al. |
| 2018/0283516 | A1 | 10/2018 | Jeyabalan |

FOREIGN PATENT DOCUMENTS

| | | |
|---|---|---|
| DE | 112013004892 T5 | 7/2015 |
| DE | 112014003383 T5 | 3/2016 |
| DE | 112015004334 T5 | 6/2017 |
| WO | 2014053388 A1 | 4/2014 |
| WO | 2016062847 A1 | 4/2016 |

\* cited by examiner

HYDRODYNAMIC TORQUE CONVERTER HAVING CONVERTER LOCK-UP CLUTCH

CROSS-REFERENCE TO RELATED APPLICATIONS

This application is the U.S. National Phase of PCT Appln. No. PCT/DE2020/100579 filed Jul. 2, 2020, which claims priority to DE 10 2019 122 692.9 filed Aug. 23, 2019, the entire disclosures of which are incorporated by reference herein.

TECHNICAL FIELD

The disclosure relates to a hydrodynamic torque converter with a converter housing and a converter torus with a pump impeller, a turbine wheel which is driven hydrodynamically by the pump impeller by means of a converter fluid, wherein, in order to bridge the hydrodynamic drive, a converter lock-up clutch which is connected between the pump impeller and the turbine wheel by means of pressure loading of the converter fluid is arranged radially between an outer circumference of the converter housing and the converter torus.

BACKGROUND

Hydrodynamic torque converters are used in motor vehicle drive trains as starting clutches with torque magnification. Here, a pump impeller connected to a converter housing transmits torque to the turbine wheel by means of a converter fluid, wherein the converter fluid is supported on a guide wheel when starting the vehicle, increasing the starting torque. To improve the efficiency of the torque converter, the pump impeller and the turbine wheel are then frictionally connected by means of a converter lock-up clutch after the starting process. A hydrodynamic torque converter is known, for example, from DE 11 2015 004 334 T4, in which the converter lock-up clutch is formed by an actuating piston arranged integrally on the turbine wheel. The actuating piston engages over a torsional vibration damper and contains a friction lining which, axially spaced from the turbine wheel and within a diameter of a converter torus of pump impeller and turbine wheel, forms a frictional connection with a mating friction surface arranged on the converter housing. The converter lock-up clutch is actuated depending on the converter fluid pressure set in the converter housing and acting on the actuating piston.

To improve the friction capacity, it is proposed in the publications WO2016/062847A1, DE 11 2014 003 383 T5 and DE 11 2013 004 892 T5 to arrange the converter lock-up clutch on a larger diameter radially outside the converter torus. In WO2016/062847A1, a friction ring arranged on the outer circumference of the turbine wheel is frictionally engaged on one side with an intermediate sleeve of the converter housing. In the publications DE 11 2014 003 383 T5 and DE 11 2013 004 892 T5, the section of the converter lock-up clutch arranged on the turbine wheel is designed in each case as an axially movable actuating piston with a friction lining which, depending on the pressure of the converter fluid, comes into frictional engagement with a mating friction surface of the converter housing.

SUMMARY

The object of the disclosure is the further development of a generic hydrodynamic torque converter. In particular, it is the object of the disclosure to propose a hydrodynamic torque converter with a further improved transmission capacity of the converter lock-up clutch.

The object is achieved by the subject matter of described in the following disclosure.

The proposed hydrodynamic torque converter is used to transmit torque with the function of a starting clutch with torque magnification between a drive unit, for example an internal combustion engine or an internal combustion engine in conjunction with an electric machine, and an automatic transmission of a drive train of a motor vehicle. The torque converter includes a converter housing that houses a converter torus with a predetermined outer diameter. The converter torus has a pump impeller with drive discs which can be connected to the converter housing, for example by means of a friction coupling, or which is integrated in the converter housing, and an axially opposed turbine wheel with discs which are driven hydrodynamically by the drive discs by means of a converter fluid contained in the converter housing, as well as a guide wheel which is arranged between the pump impeller and the turbine wheel and is supported by means of a freewheel on a converter neck which is fixedly connected to the gearbox.

To bridge the hydrodynamic drive, for example, at higher speeds of the drive unit or when the efficiency of the hydrodynamic torque transmission drops, a converter lock-up clutch is arranged between the pump impeller and the turbine wheel by means of pressure loading of the converter fluid. To increase the transmission capacity of the converter lock-up clutch, the corresponding friction surfaces provided between the converter housing and the turbine wheel are arranged radially on a large diameter between an outer circumference of the converter housing and the converter torus. The turbine wheel has at least one friction disc which can be prestressed axially between a pressure-loaded annular piston, which is hooked in an axially movable manner into the converter housing, and a converter housing section radially outside the converter torus. In this way, the friction surface can be doubled by frictional engagement on both sides of each friction disc, so that a correspondingly increased transmission capacity can be achieved. The annular piston is sealed radially on the outside relative to the converter housing and is axially movable and mounted in a non-rotatable manner on the latter. For example, to receive the annular piston in a non-rotatable manner, a projection of a second housing shell, which is tightly welded to the first housing shell and overlaps axially with a first housing shell of the converter housing, can have a face profile which is in mesh with a complementary face profile of the annular piston. The axial length of this profiling is dimensioned such that an axial travel of the annular piston is covered when the torque converter lock-up clutch is actuated.

For example, for manufacturing reasons, for improved actuation of the torque converter lock-up clutch and/or the like, a friction lining is arranged on the annular piston, which forms a frictional engagement with a mating friction surface made of steel of the at least one friction disc. To create a high frictional torque, this friction lining and the mating friction surface preferably form a tight friction pairing for the converter fluid. Frictional engagement between a mating friction surface of the converter housing section or, in the case of a plurality of friction discs, a further friction disc is effected in each case by means of a friction pairing of a friction lining arranged on one friction disc and a mating friction surface made of steel on the other side of the friction disc. The friction linings can be designed as paper linings or sintered or pressed mixed linings. When forming the frictional engagement, which is tight for the converter fluid, heat is dissipated via the annular piston or the friction disc. The remaining frictional engagements can have grooves, in particular grooves leading from radially inward to radially outward, for improved cooling. To displace excess converter fluid in a single friction disc, the friction lining forming the frictional engagement opposite the converter housing section can have grooves to displace excess converter fluid radially inward when the converter lock-up clutch is closed.

To provide several friction discs, one or more friction discs can be provided as an alternative to or in addition to a friction disc connected to or provided integrally with the turbine wheel, which can be axially layered and hooked into an inner multiple disc carrier in a non-rotatable manner connected to the turbine wheel, for example welded. The friction discs alternate axially with a corresponding number of friction discs, which are hooked into an outer multiple disc carrier connected to the converter housing in a non-rotatable manner. Such a disc stack of alternately layered friction discs of the converter housing and the turbine wheel are prestressed axially by the annular piston against a converter housing section with a mating friction surface radially outside the converter torus and inside its installation space.

The outer multiple disc carrier can be formed from a ring part with appropriate profiling such as circumferential toothing, which can be mounted, for example welded, to the inside of the outer circumference of the converter housing, for example an axial projection of a housing shell with the pump impeller. Alternatively, the outer multiple disc carrier can be formed as a circumferential profiling into the outer circumference of the converter housing, for example into the axial projection of the housing shell, for example by punching.

The hydrodynamic torque converter advantageously includes a torsional vibration damper which is effectively arranged between the turbine wheel and an output hub using which the turbine wheel is also received, for example centered. The input part of the torsional vibration damper is connected to the turbine wheel, for example welded, hooked by means of tabs and soldered or otherwise tightly and firmly connected to the discs of the turbine wheel. The turbine wheel can be mounted directly on the output hub or connected to the output part of the torsional vibration damper. The torsional vibration damper can be designed with several stages. For example, several sets of circumferentially distributed helical compression springs on different diameters can be arranged between the input part and the output part. For example, helical compression springs designed as bow springs can be received radially on the outside distributed around the circumference in a retaining shell. Radially inward, short helical compression springs can be provided distributed around the circumference between the input part and the output part. The output part can, for example, form the retaining shell for the bow springs, while a flange part connected to the turbine wheel and designed as an input part engages in the retaining shell and loads the bow springs on the input side. The input part can form the inner multiple disc carrier of the torque converter lock-up clutch designed with several friction discs. Alternatively, the retaining shell can be received on the turbine wheel, for example by being welded to it. A flange part provided on the output part engages on the output side in the retaining shell for loading the bow springs on the output side.

To improve the torsional vibration isolation of the hydrodynamic torque converter, a centrifugal pendulum can be provided in addition to the torsional vibration damper. In a preferred manner, the centrifugal pendulum is mounted on the torsional vibration damper. For example, the centrifugal pendulum can be connected to the output part. For example, a pendulum mass carrier of the centrifugal pendulum with pendulum-capable pendulum masses arranged on both sides and a side part for loading the radially inner helical compression springs can be integrally designed.

BRIEF DESCRIPTION OF THE DRAWINGS

The disclosure is explained in more detail with reference to the exemplary embodiments shown in FIGS. 1 to 5. These show.

DETAILED DESCRIPTION

Figure 1:
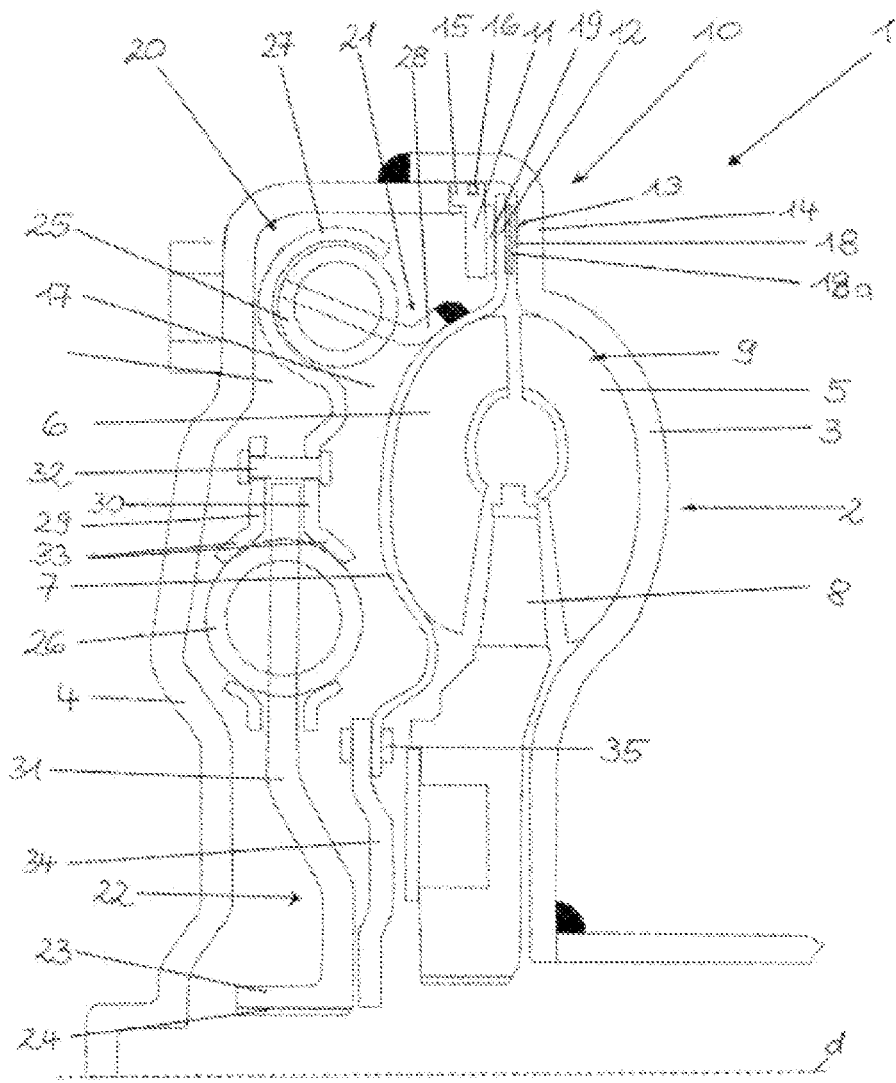
FIG. 1 shows a sectional view of the upper part of a hydrodynamic torque converter, which is arranged around an axis of rotation.

FIG. 1 shows a sectional view of the upper part of the hydrodynamic torque converter 1, which is arranged so that it can be rotated around the axis of rotation d. The converter housing 2 is formed by the two housing shells 3, 4, which axially overlap radially outside and are tightly connected to one another. The housing shell 3 contains the pump impeller 5 with drive discs distributed around the circumference. Axially opposite is the turbine wheel 6 with discs designed to complement the drive discs of the pump impeller 5 and attached to the turbine shell 7. The guide wheel 8 is arranged between the pump impeller 5 and the turbine wheel 6. The pump impeller 5, the turbine wheel 6 and the guide wheel 8 form the converter torus 9.

Radially outside the converter torus 9 and in its axial installation space is the converter lock-up clutch 10, which contains the annular piston 11, the friction disc 12 and the mating friction surface 13 on the converter housing section 14 as functional components.

The annular piston 11 is received by means of the profiling 15 of the housing shell 4 in a non-rotatable manner and sealed to the converter housing 2 and with respect to it by means of the sealing ring 16. By increasing the pressure in the chamber 17 of the converter housing 2 filled with converter fluid, the annular piston 11 is displaced axially and prestresses the friction disc 12 against the mating friction surface 13, forming a frictional engagement.

The friction disc 12 is formed integrally from the turbine shell 7 by radial extension of the latter. The friction disc 12 contains the friction lining 18 facing the mating friction surface 13. The frictional engagement between the annular piston 11 and the friction disc 12 is formed by means of the friction lining 19 arranged on the annular piston 11 and a steel surface of the friction disc 12. To improve actuation of the torque converter lock-up clutch 10, the friction lining 19 has no grooves and thus forms a sealed friction surface to the friction disc 12, while the friction lining 18 forms grooves 18a from radially inward to radially outward so that excess converter fluid is displaced radially inward when the torque converter lock-up clutch 10 is closed.

The hydrodynamic torque converter 1 contains, within the chamber 17, the torsional vibration damper 20, the input part 21 of which is connected to the turbine wheel 6 and the output part 22 of which forms the output hub 23 with the internal toothing 24, which is rotationally connected, for example, by means of a gearbox input shaft of a gearbox.

The torsional vibration damper 20 is designed in two stages and for this purpose has helical compression springs 25 distributed radially on the outside over the circumference and short helical compression springs 26 distributed radially on the inside over the circumference. The helical compression springs 25 are supported in the retaining shell 27 against the action of centrifugal forces and are loaded by the latter on the output side. The input side loading takes place by means of the flange part 28 designed as an input part 21, which is welded to the turbine shell 7. The helical compression springs 25 are arranged radially outside the converter torus 9 in the chamber 17 to save installation space.

The helical compression springs 26 are arranged radially within the maximum axial extent of the turbine wheel 6 to save installation space and are received in window-shaped recesses in the side parts 29, 30 and the output flange 31 arranged between them, and are loaded on the input and output sides. The side parts 29, 30 are connected to one another in an axially spaced manner by means of the spacer bolts 32 and support the helical compression springs 26 by means of axially flared window sashes 33. The damper stages are connected to the helical compression springs 25, 26 by means of the retaining shell 27, which forms the side part 30 facing the turbine shell 7. The output flange 31 is integrally connected to the output hub 23.

The turbine wheel 6 is centered on a shaft not shown, such as the gearbox input shaft of a gearbox, by means of the turbine flange 34, which is connected to the turbine shell 7 by means of the rivet 35. The torsional vibration damper 20 is effective between the converter housing 2 and the output hub 23 when the converter lock-up clutch 10 is closed. When the converter lock-up clutch 10 is open, the torsional vibration damper 20 acts as a so-called turbine damper by forwarding the torque transmitted from the pump impeller 5 to the turbine wheel 6 to the output hub 23 via the torsional vibration damper 20.

Figure 2:
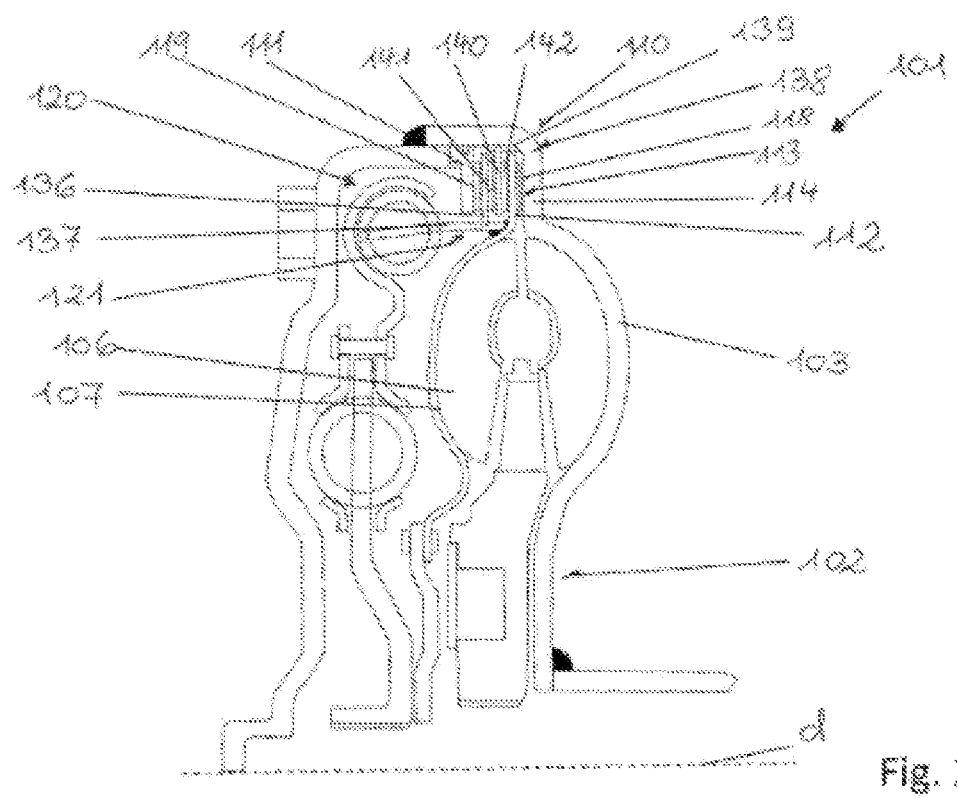
FIG. 2 shows a sectional view of the upper part of a torque converter with a disc stack, which is arranged around an axis of rotation and has been modified compared to the torque converter in FIG. 1.

FIG. 2 shows a sectional view of the upper part of the hydrodynamic torque converter 101, which is similar to the hydrodynamic torque converter 1 and is arranged so that it can be rotated around the axis of rotation d. In contrast to the hydrodynamic torque converter 1, the hydrodynamic torque converter 101 has the converter lock-up clutch 110 with the friction disc 136 in addition to the friction disc 112 formed from the turbine shell 107 of the turbine wheel 106. The friction disc 136 is hooked in a non-rotatable manner into the input part 121 of the torsional vibration damper 120, which acts as an inner multiple disc carrier 137, by means of an inner profiling. To form a disc stack 138, the friction disc 140 is hooked in a non-rotatable manner into the outer multiple disc carrier 139 of the housing shell 103 of the converter housing 102.

Here, the annular piston 111, the friction disc 136, the friction disc 140, the friction disc 112, and the mating friction surface 113 of the converter housing section 114 form the layering of the disc stack 138. The annular piston 111 carries the friction lining 119, the friction discs 112, 136, 140 each carry friction linings 118, 141, 142 on their side facing away from the annular piston 111, so that a friction lining/steel friction pairing is formed in each case.

Figure 3:
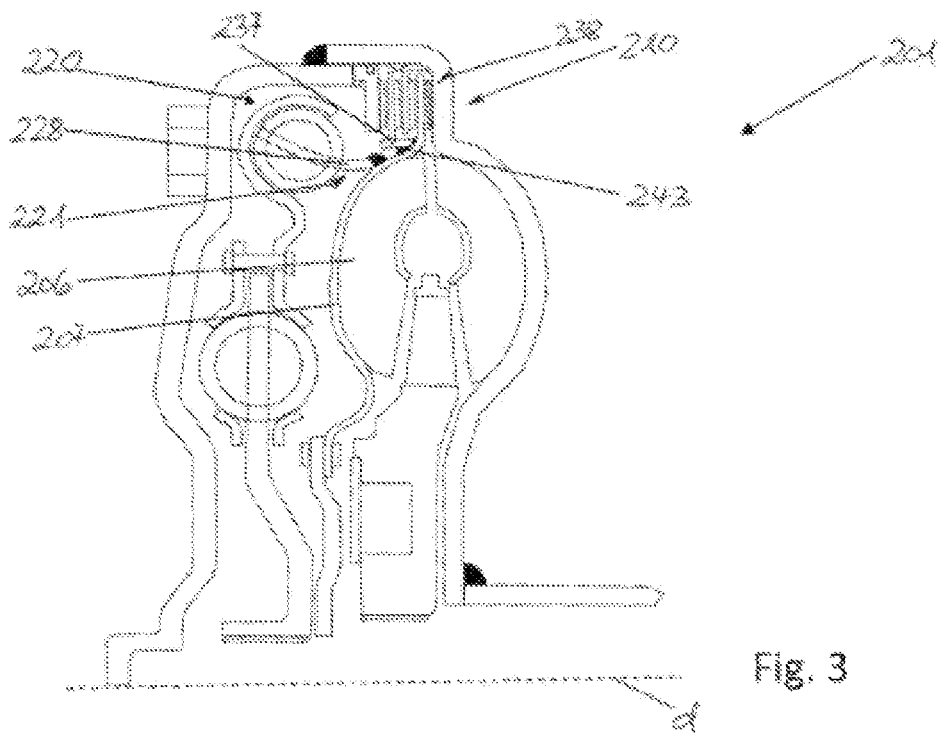
FIG. 3 shows a sectional view of the upper part of a torque converter with a disc stack, which is arranged around an axis of rotation and has been modified compared to the torque converter of FIG. 2.

FIG. 3 shows a sectional view of the upper part of the hydrodynamic torque converter 201, which is arranged around the axis of rotation d and is similar to the hydrodynamic torque converter 101 of FIG. 2. Unlike the hydrodynamic torque converter 101, the hydrodynamic torque converter 201 has the converter lock-up clutch 210 with the disc stack 238, the inner multiple disc carrier 237 of which is designed to be separate from the flange part 228 of the input part 221 of the torsional vibration damper 220. The inner multiple disc carrier 237 and the flange part 228 are each independently welded to the turbine shell 207 of the turbine wheel 206. The inner multiple disc carrier 237 also includes the radial support weld 243 to prevent the inner multiple disc carrier 237 from deflecting radially inward.

Figure 4:
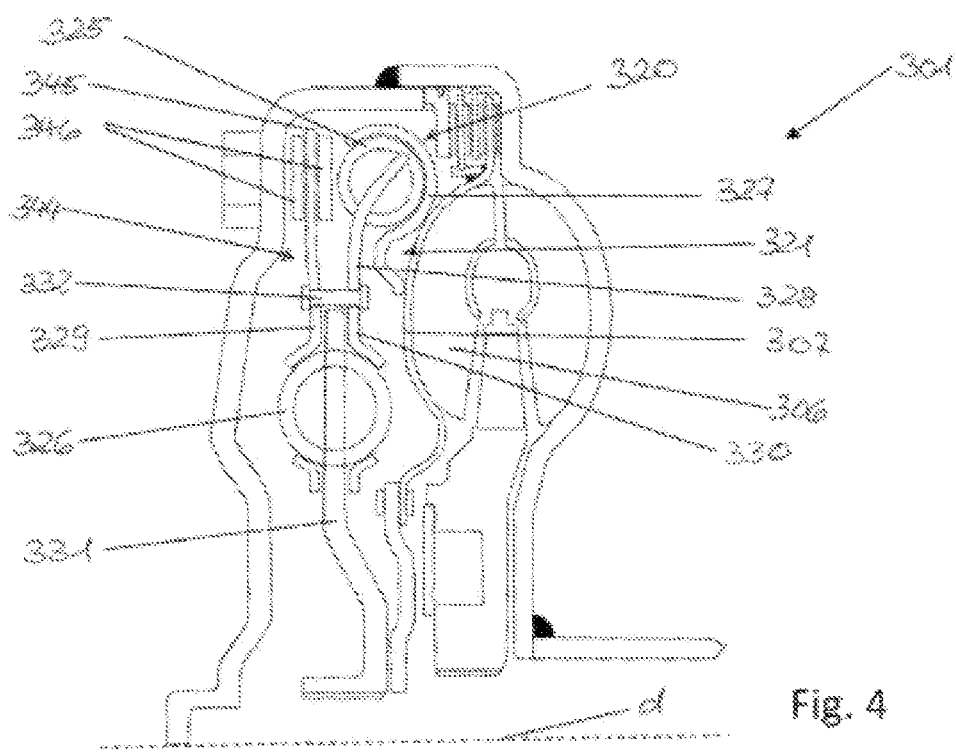
FIG. 4 shows a sectional view of the upper part of a torque converter with a disc stack, which is arranged around an axis of rotation and has been modified compared to the torque converter of FIGS. 1 to 3

FIG. 4 shows the upper part of the hydrodynamic torque converter 301 arranged around the axis of rotation d, which is provided with the centrifugal pendulum 344 in modification with respect to the hydrodynamic torque converters 1, 101, 201 of FIGS. 1 to 3.

The centrifugal pendulum 344 is connected to the output side part of the torsional vibration damper 320. In the exemplary embodiment shown, the pendulum mass carrier 345 is integrally formed with the side part 329. The pendulum masses 346, which are received in a pendulum-capable manner on the pendulum mass carrier 345 on both sides by means of pendulum bearings not shown in the centrifugal force field of the torque converter 301 rotating around the axis of rotation d, are received at the radial height of the helical compression springs 325. To save axial installation space, the retaining shell 327 is designed as an input part 321 on the input side and welded to the turbine shell 307 of the turbine wheel 306. The pendulum mass carrier 345 and the flange part 328 loading the output side of the helical compression springs 325 form the side parts 329, 330 spaced apart axially by means of the spacer bolts 332 for loading the input side of the helical compression springs 326 arranged radially on the inside. The output flange 331 arranged between the side parts 329, 330 handles the output-side loading of these.

Figure 5:
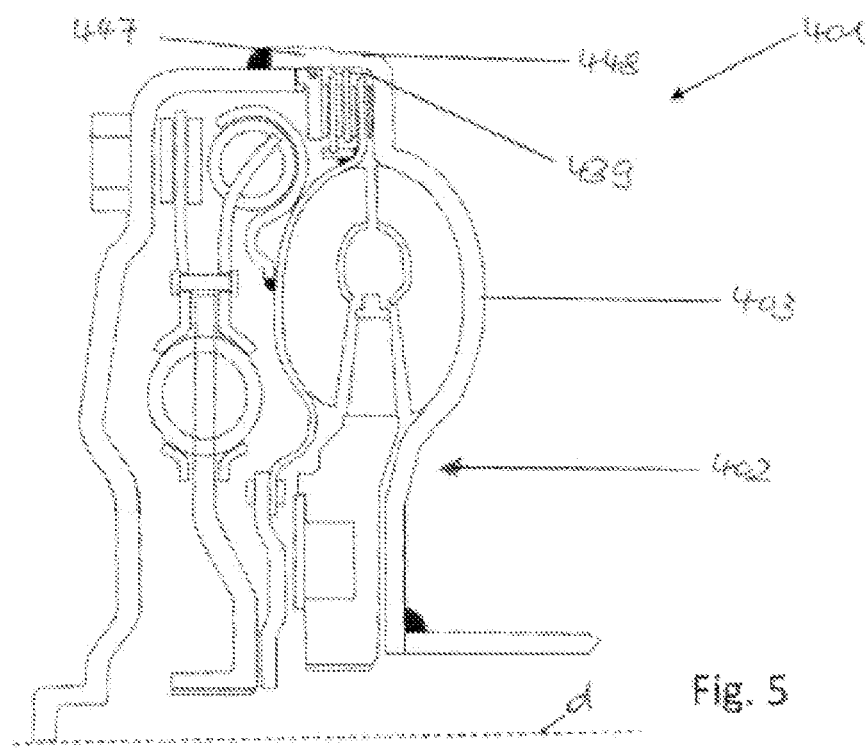
FIG. 5 shows a sectional view of the upper part of a torque converter with a disc stack, which is arranged around an axis of rotation and has been modified compared to the torque converter of FIG. 4.

FIG. 5 shows a sectional view of the upper part of the hydrodynamic torque converter 401, which is arranged so that it can be rotated around the axis of rotation d. As an alternative to the outer multiple disc carriers shown in FIGS. 2 to 4, which are formed from a ring part inserted into the converter housing and connected in a non-rotatable manner, the outer multiple disc carrier 439 is formed integrally from the housing shell 403 of the converter housing 402. For this purpose, indentations 448 are provided in the axial projection 447 of the housing shell 403, distributed over the circumference in a radially inward direction and forming the inner profile of the outer multiple disc carrier 439. It is to be understood that the outer multiple disc carriers of the torque converters 101, 201, 301 of FIGS. 2 to 4 can also include such indentations 448.

LIST OF REFERENCE SIGNS

1 Hydrodynamic torque converter
2 Converter housing
3 Housing shell
4 Housing shell
5 Pump impeller
6 Turbine wheel 7 Turbine shell
8 Guide wheel
9 Converter torus
10 Converter lock-up clutch
11 Annular piston
12 Friction disc
13 Mating friction surface
14 Converter housing section
15 Profiling
16 Sealing ring
17 Chamber
18 Friction lining
18a Groove
19 Friction lining
20 Torsional vibration damper
21 Input part
22 Output part
23 Output hub
24 Internal toothing
25 Helical compression spring
26 Helical compression spring
27 Retaining shell
28 Flange part
29 Side part
30 Side part
31 Output flange
32 Spacer bolt
33 Window sash
34 Turbine flange
35 Rivet
101 Hydrodynamic torque converter
102 Converter housing
103 Housing shell
106 Turbine wheel
107 Turbine shell
110 Converter lock-up clutch
111 Annular piston
112 Friction disc
113 Mating friction surface
114 Converter housing section
118 Friction lining
119 Friction lining
120 Torsional vibration damper
121 Input part
136 Friction disc
137 Inner multiple disc carrier
138 Disc stack
139 Outer multiple disc carrier
140 Friction disc
141 Friction lining
142 Friction lining
201 Hydrodynamic torque converter
206 Turbine wheel
207 Turbine shell
210 Converter lock-up clutch
220 Torsional vibration damper
221 Input part
228 Flange part
237 Inner multiple disc carrier
238 Disc stack
243 Support weld
301 Hydrodynamic torque converter
306 Turbine wheel
307 Turbine shell
320 Torsional vibration damper
321 Input part
325 Helical compression spring
326 Helical compression spring
327 Retaining shell
328 Flange part
329 Side part
330 Side part
331 Output flange
332 Spacer bolt
344 Centrifugal pendulum
345 Pendulum mass carrier
346 Pendulum mass
401 Hydrodynamic torque converter
402 Converter housing
403 Housing shell
439 Outer multiple disc carrier
447 Projection
448 Indentation
d Axis of rotation

The invention claimed is:

1. A hydrodynamic torque converter comprising a converter housing and a converter torus having a pump impeller, a turbine wheel driven hydrodynamically by the pump impeller by a converter fluid, wherein, in order to bridge a hydrodynamic drive, a converter lock-up clutch which is connected between the pump impeller and the turbine wheel by pressure loading of the converter fluid is arranged radially between an outer circumference of the converter housing and the converter torus, wherein the turbine wheel is assigned a turbine friction disc which can be prestressed axially between a pressure-loaded annular piston, which is provided with a friction lining and which is hooked in an axially movable manner into the converter housing, and a mating friction surface of a converter housing section radially outside the converter torus, wherein an inner multiple disc carrier is attached to the turbine wheel, and at least one inner friction disc is hooked into the inner multiple disc carrier in a non-rotatable manner, wherein an input part of a torsional vibration damper is attached to the turbine wheel.

2. The hydrodynamic torque converter according to claim 1, wherein the turbine friction disc is integrally connected to the turbine wheel and carries a friction lining on a side facing the converter housing section.

3. The hydrodynamic torque converter according to claim 1, wherein a plurality of friction discs, including the at least one inner friction disc and at least one outer friction disc, are arranged in an axially alternating manner, the at least one outer friction disc being hooked in a non-rotatable manner into an outer multiple disc carrier connected to the converter housing.

4. The hydrodynamic torque converter according to claim 3, wherein the outer multiple disc carrier is formed from a ring part connected to the converter housing.

5. The hydrodynamic torque converter according to claim 3, wherein the outer multiple disc carrier is formed in the converter housing.

6. The hydrodynamic torque converter according to claim 3, wherein the plurality of friction discs are disposed axially between the pressure-loaded annular piston and the turbine wheel friction disc.

7. The hydrodynamic torque converter according to claim 1, wherein the input part forms the inner multiple disc carrier.

8. The hydrodynamic torque converter according to claim 1, wherein a centrifugal pendulum is received on the torsional vibration damper.

9. The hydrodynamic torque converter according to claim 8, wherein a pendulum mass carrier of the centrifugal pendulum is integrally connected to a side part loading helical compression springs of the torsional vibration damper.

10. The hydrodynamic torque converter according to claim 1, wherein the at least one inner friction disc is disposed axially between the pressure-loaded annular piston and the turbine wheel friction disc.

11. A hydrodynamic torque converter, comprising:
a converter housing formed by first and second housing shells that axially overlap and are connected to one another;
a converter torus having a pump impeller and a turbine wheel driven hydrodynamically by the pump impeller by a converter fluid, wherein the first housing shell forms an impeller shell of the pump impeller;
a torsional vibration damper including an input part attached to the turbine wheel; and
a converter lock-up clutch connected between the pump impeller and the turbine wheel by pressure loading of the converter fluid, the converter lock-up clutch being further arranged radially between an outer circumference of the converter housing and the converter torus, wherein the turbine wheel includes a turbine wheel friction disc configured to be prestressed axially between a pressure-loaded annular piston and a mating friction surface of the first housing shell of the converter housing located radially outside the converter torus;
wherein the converter lock-up clutch further comprises:
a plurality of friction discs disposed axially between the pressure-loaded annular piston and the turbine wheel friction disc; and
an inner multiple disc carrier attached to the turbine wheel, wherein at least one of the plurality of friction discs is hooked into the inner multiple disc carrier in a non-rotatable manner;
wherein the input part forms the inner multiple disc carrier.

12. The hydrodynamic torque converter according to claim 11, wherein the pressure-loaded annular piston is hooked in an axially movable manner into the converter housing and sealed to an inner surface of the first housing shell by a sealing ring.

13. The hydrodynamic torque converter according to claim 11, wherein, in response to the converter housing being filled with the converter fluid, the pressure-loaded annular piston is configured to be displaced axially and prestress the turbine wheel friction disc against the mating friction surface to form a frictional engagement therewith.

14. The hydrodynamic torque converter according to claim 11, wherein the turbine wheel friction disc is integrally connected with the turbine wheel.

15. The hydrodynamic torque converter according to claim 11, wherein the converter lock-up clutch further includes an outer multiple disc carrier connected to the converter housing, wherein the plurality of friction discs are arranged in an axially alternating manner with at least one of the plurality of friction discs hooked in a non-rotatable manner into the outer multiple disc carrier.

16. A hydrodynamic torque converter, comprising:
a converter housing formed by first and second housing shells that axially overlap and are connected to one another;
a converter torus having a pump impeller and a turbine wheel driven hydrodynamically by the pump impeller by a converter fluid, wherein the first housing shell forms an impeller shell of the pump impeller; and
a converter lock-up clutch connected between the pump impeller and the turbine wheel by pressure loading of the converter fluid, the converter lock-up clutch being further arranged radially between an outer circumference of the converter housing and the converter torus, wherein the turbine wheel includes a turbine wheel friction disc configured to be prestressed axially between a pressure-loaded annular piston and a mating friction surface of the first housing shell of the converter housing located radially outside the converter torus;
wherein the converter lock-up clutch further comprises:
a plurality of friction discs disposed axially between the pressure-loaded annular piston and the turbine wheel friction disc; and
an inner multiple disc carrier attached to the turbine wheel, wherein at least one of the plurality of friction discs is hooked into the inner multiple disc carrier in a non-rotatable manner;
wherein the turbine friction disc is integrally connected with the turbine wheel and is disposed axially between the inner multiple disc carrier and the pump impeller.

17. The hydrodynamic torque converter according to claim 16, wherein the pressure-loaded annular piston is hooked in an axially movable manner into the converter housing and sealed to an inner surface of the first housing shell by a sealing ring.

18. The hydrodynamic torque converter according to claim 16, wherein the converter lock-up clutch further includes an outer multiple disc carrier connected to the converter housing, wherein the plurality of friction discs are arranged in an axially alternating manner with at least one of the plurality of friction discs hooked in a non-rotatable manner into the outer multiple disc carrier.

19. The hydrodynamic torque converter according to claim 18, wherein the pressure-loaded annular piston is axially aligned with the outer multiple disc carrier.

20. The hydrodynamic torque converter according to claim 16, wherein, in response to the converter housing being filled with the converter fluid, the pressure-loaded annular piston is configured to be displaced axially and prestress the turbine wheel friction disc against the mating friction surface to form a frictional engagement therewith.

* * * * *